3,745,166
PROCESS FOR STRIPPING HYDROGEN CYANIDE FROM PYRIDINE SALT SOLUTIONS
William J. Didycz, Whitehall, Pa., assignor to United States Steel Corporation
No Drawing. Filed Apr. 15, 1971, Ser. No. 134,425
Int. Cl. C07d 31/18
U.S. Cl. 260—296 D
4 Claims

ABSTRACT OF THE DISCLOSURE

A process for the removal of HCN from streams containing pyridine salts comprising contacting the HCN rich stream with a hydrogen and methane rich gas.

BACKGROUND OF THE INVENTION

The light oil fraction recovered from the distillation of coal, boiling in the range between 75° and 350° F., is rich in pyridine bases. Generally, however, the light oil fraction also contains HCN in amounts up to about 0.5 weight percent. The pyridine bases can be removed from the light oil fraction by contacting the light oil fraction with a mineral acid, as for example, sulfuric or phosphoric acid. Some of the HCN present in the light oil fraction is also extracted into the mineral acid along with the pyridine bases. The presence of HCN in mineral acid stream causes foaming in the pyridine stripper which in turn causes flooding and limits the capacity of the stripper. Further, since HCN is poisonous, it is undesirable in the pyridine product.

It has been proposed to steam strip the pyridine base containing mineral acid stream to remove the entrained HCN. This process has the disadvantage of prohibitively high pyridine loss and high equipment corrosion rate due to the high operating temperature.

Therefore, it is an object of this invention to provide a process for the removal of entrained HCN at low temperatures thereby reducing pyridine loss and equipment corrosion.

SUMMARY OF THE INVENTION

Accoringly, I have discovered that HCN can be removed from liquids containing pyridine salts by contacting the pyridine salt containing stream with a stripping gas composed essentially of hydrogen, methane and methane homologues of up to four carbon atoms in the chain. Use of the stripping gas of my invention rather than steam allows a lower temperature operation which results in lower pyridine loss to the gas stream and virtually complete removal of HCN. Also, the lower temperature operation results in a low corrosion rate of the vessels used in the separation.

An added advantage of my invention is the ease of disposal of the HCN rich gas stream exiting from the stripping operation. The gas stream can easily be injected in a fuel gas line, whereas steam stripping would require a condenser and other liquid handling equipment to dispose of the HCN stream.

DETAILED DESCRIPTION

In the practice of my invention, the liquid containing pyridine salts and the stripping gas are contacted, at a temperature of from about 100 to 200° F., and at a pressure of from about 10 to 100 p.s.i.a. At temperatures above this range, excessive water loss occurs causing condensation problems. At temperatures below this range, the stripping efficiency is too low. Practical considerations of equipment design limit the upper pressure range. At pressures below about 10 p.s.i.a., the stripping efficiency drops off rapidly. The liquid feed and the stripping gas may be contacted by any suitable method such as by bubbling the gas through the liquid, or by using any simple gas-liquid mixing device. The liquid and gas may be contacted co- or countercurrently. I prefer to countercurrently flow the liquid and gas through a stripping column of one or more theoretical stages obtained by the use of any commercially available packing, such as glass beads or Rashig rings and the like, or distillation tray design. Best results are obtained at temperatures of about 145 to 170° F. and pressures of about 20 to 30 p.s.i.a. Under the preferred conditions and where the mineral acid stream contains less than about 1 weight percent HCN, better than 98% removal occurs using a two-stage column.

The temperature in the column may be maintained by preheating one or both of the feed streams. I prefer to preheat both feed streams to about 140–170° F. by the injection of steam. The steam serves the dual purpose of preheating the streams and of maintaining the water equilibrium in the product stream.

The stripping gas may be tail gas, a gas rich in hydrogen and methane and obtained from the regenerators in a coke plant, or it may be natural gas or any other gas rich in hydrogen, methane and/or methane homologues of up to four carbon atoms in the chain.

Although I have described my invention in terms of pyridine, it is to be understood that homologues of pyridine, such as the picolines and the di- and tri-methylated pyridines, are also within the scope of my invention.

The following example illustrates my invention but is not intended to be limiting.

EXAMPLE

A cryogenically recovered light oil fraction from the distillation of coal boiling in the range of 75–350° F. containing HCN and pyridine bases is contacted with sulfuric acid. The acid fraction, containing extracted pyridine bases in the form of dipyridinium sulfate and 0.717 weight percent HCN, is passed through a heat exchanger to preheat it to 158° F. Tail gas, composed essentially of hydrogen and methane, is also passed through a heat exchanger to preheat it to 158° F. The preheated HCN-rich dipyridinum sulfate (DPS) solution is introduced into the top of a stripping column packed with glass beads, and maintained at a pressure of 26 p.s.i.a. The preheated tail gas is introduced into the bottom. The tail gas strips the HCN from the DPS stream and exits at the top. The stripped DPS stream containing 0.01 weight percent HCN exits at the bottom of the colunm. The 158° F. temperature on the column is maintained by the introduction of steam into the tail gas stream. 98.6 percent of the HCN and 0.2 percent of the pyridine are transferred from the DPS to the tail gas stream.

I claim:
1. In a process for the removal of hydrogen cyanide from a cryogenically recovered light oil fraction containing dipyridinium, the step of contacting, at a temperature of from about 100° F. to about 200° F. and a pressure of from about 10 to about 100 p.s.i.a., the hydrogen cyanide rich liquid with a stripping gas composed essentially of hydrogen and homologues of the methane series containing 1 to 4 carbon atoms in the chain.

2. The process of claim 1 wherein said stripping gas is natural gas.

3. The process of claim 1 wherein said stripping gas is tail gas.

4. The process of claim 1 wherein the temperature is from about 145 to about 170° F. and the pressure is from about 20 to about 30 p.s.i.a.

References Cited

UNITED STATES PATENTS 2,799,678   7/1957   Sweeney _____ 260—290

OTHER REFERENCES

Elderfield: Heterocyclic Compounds, vol. I, Wiley Publishers, 410–411 (1950).

ALAN L. ROTMAN, Primary Examiner

U.S. Cl. X.R.

260—290 A